No. 784,219. PATENTED MAR. 7, 1905.
F. J. LEWIS.
BOTTLE FILLING MACHINE.
APPLICATION FILED OCT. 1, 1902.

WITNESSES.
Chas. K. Davis
M. E. Brown

INVENTOR.
F. J. Lewis
By W. A. Bartlett
Attorney.

No. 784,219.

Patented March 7, 1905.

UNITED STATES PATENT OFFICE.

FREDERICK J. LEWIS, OF SACRAMENTO, CALIFORNIA.

BOTTLE-FILLING MACHINE.

SPECIFICATION forming part of Letters Patent No. 784,219, dated March 7, 1905.

Application filed October 1, 1902. Serial No. 125,586.

*To all whom it may concern:*

Be it known that I, FREDERICK J. LEWIS, a citizen of the United States, residing at Sacramento, in the county of Sacramento and State of California, have invented certain new and useful Improvements in Bottle-Filling Machines, of which the following is a specification.

This invention relates to bottle-filling machines.
chines.

The object of the invention is to produce a machine for filling liquids into bottles which is automatic in its cut-off and yet may be manipulated to give an additional feed after the automatic cut-off; also to insure the closure of the valve when the cut-off takes effect; also to construct a machine which is readily adapted for use with bottles of various sizes; also to improve bottle-filling machines in various particulars, and especially so that the attendant can leave the machine at any time without danger of overflow of any of the bottles or wastage of the fluid.

Figure 1:
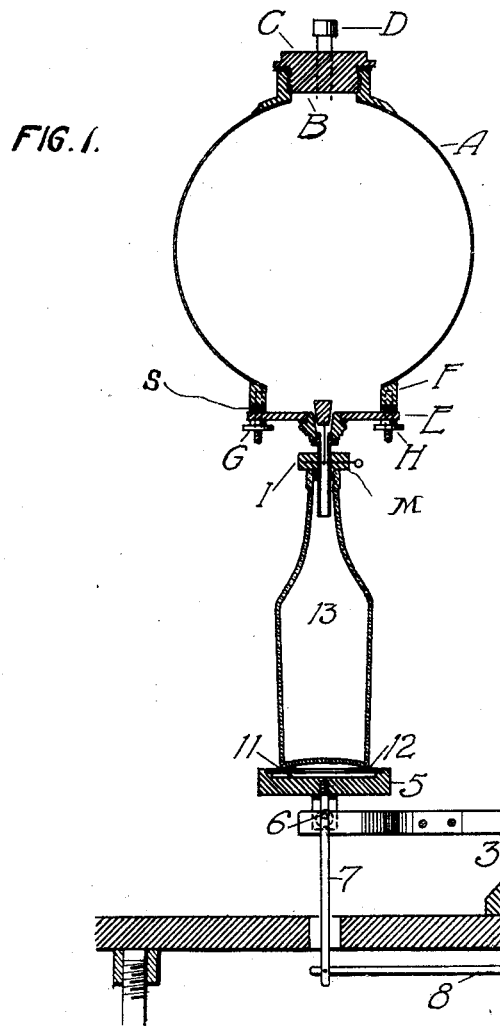
Figure 2:
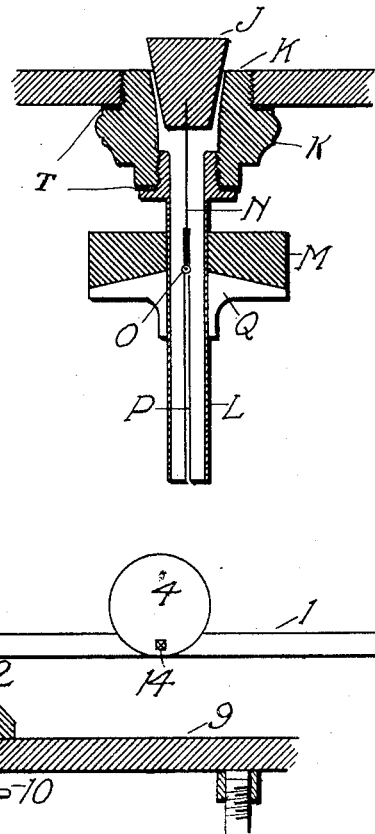
Figure 3:
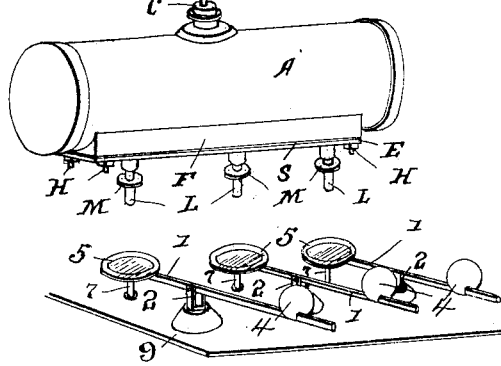

Figure 1 is a cross-section of the machine through one of the valves and bottle-supports. Fig. 2 is a longitudinal section of the valve much enlarged as compared with Fig. 1. Fig. 3 is a perspective view of a machine, showing a plurality of filling devices.

A indicates a vessel or tank in which the liquid is contained. This tank is preferably of cylindrical form and of any suitable material and lies with its axis in horizontal position.

At the upper side of tank A there is an opening B, which is closed by a screw-plug C. A vent-tube D passes through the screw-plug and affords a means for letting in air as the liquid is drawn off or of forcing in air if desirable to expel a thick or viscid fluid.

A longitudinal opening at the bottom of tank A, such as would be made by the omission of stave from a built-up cylinder, gives a place for the attachment of parallel flanges F F. These flanges are riveted or otherwise attached to tank A. A metallic cover E extends across this opening, and such cover is held in place by bolts G, which are attached to the flanges and pass through holes in the plate or cover, and by nuts H, which screw on said bolts. The plate or cover E can be removed for the purpose of cleaning the tank or for the ready attachment of the valves, which will be described. A packing S, of rubber or other suitable material, may be interposed between the flanges and cover to secure a tight joint.

The plate or cover E has suitable perforations at intervals for the attachment of the nozzles or valve-seats K, which valve-seats preferably screw into the perforations, having packing-rings or gaskets T interposed between the plate or cover and a shoulder on the valve-seat.

The valve-seat has a tapered passage, not tapered in form of a true cone, but having convex sides, as indicated in Fig. 2. The valve J is a frusto-conical plug of block-tin or other suitable material, which finds its seat in the tapered passage described and will close the opening whether the face of the plug is exactly horizontal or not, the form of valve-seat giving a small latitude of movement to the plug and permitting the plug to lift with slight suction from any closed position.

The plug J has a downwardly-projecting wire N rigid therewith, and this wire prevents the plug from getting out of its seat as well as serving other purposes to be explained.

The nipple or nozzle L screws into the lower end of valve-seat K, the joint being made tight by a gasket T, if desirable. The nipple L is in its lower portion a slotted tube of such size as to pass inside the neck of the bottles to be filled. A weight M surrounds this nozzle and slides loosely thereon. A pin O passes through the weight and through the slot in the nozzle and through a loop at the lower end of wire N, so that when the weight is lifted the plug J is raised, and vice versa.

The weight M has a groove Q in its lower face, which groove serves as an air-passage for venting the bottle.

Now suppose a bottle is applied to the nozzle so as to have its neck surround the same and is then lifted so as to lift the weight. This lifts plug J by means of wire N, and the liquid from the tank runs down through the valve-seat and nozzle into the bottle. When the bottle is lowered, the valve drops down and shuts off the supply. To cause this closure to work automatically, the bottles are mounted on a balanced platform, so as to yield when the weight of bottle and contents reaches the desired amount, as will now be explained.

The bottle to be filled is supported on a yielding platform 5 under each nozzle. This platform 5 is mounted on a lever 1, which lever is balanced (after the manner of a scale-beam) by a knife-edge bearing 3 resting on fulcrum or support 2. The platform 5 has a knife-edge bearing 6 on the lever or beam 1, similar to a very common mounting of a scale-platform. The upper face of platform 5 is kept in approximately horizontal position by means of a bar 7, which extends downward from said platform through a hole in table 9 and is pivoted to a bar 8, which in turn is pivoted to post 10 under the table. It will be readily understood that such construction permits a yielding of platform 5 and a slight oscillation thereof, but the upper face of the platform remains in a substantially horizontal position.

A weight 4 on lever 1 may be adjusted thereon and held at any point by means of set-screw 14.

The upper face of platform 5 is cupped, as at 11, and a flat ring or washer 12 is placed in the cup, with its outer edge supported on the metal of the platform and the inner edge of the ring overhanging the cup, so as to afford an elastic support when the bottle 13 is placed thereon.

The machine having been constructed as described, its operation is as follows: As bottles are seldom uniform in weight, I take one of the lighter bottles and fill it with the liquid to serve as a "standard." This bottle is placed in turn on each of the platforms 5, and the weights 4 are adjusted so as to yield under the weight of the standard-filled bottle. The table 9 is itself adjusted in height by any suitable means, so that the neck of the bottle when resting on platform 5 in its elevated position lifts weight M, and consequently lifts valve-plug J, through the connections described. When the weight of the bottle and contents depresses platform 5, weight M draws the valve to closed position and shuts off the feed of liquid through the nozzle. The machine having been adjusted to close valve J when the weight of the standard filled bottle has been reached, the operator places the bottles on the platforms 5, with their necks surrounding the nozzles, and then releases them. The weights 4 raise the bottles and open the valves and hold the bottles elevated until the standard weight has been reached, when the platform yields and the bottle moves down, the effect being to close the valve J; but as the standard bottle was a light one it is unlikely that the average heavier bottle will be quite filled. The attendant sees the bottles on the depressed platforms, and if these be not quite full he lifts each bottle separately, thereby lifting the weight and opening the valve. As but a small quantity of liquid will be needed to complete the filling the bottle after it has reached the standard weight, this hand manipulation of the bottle requires but an instant of time. Consequently the attendant has merely to place the bottles on the various platforms, leaving one bottle to fill while he is placing others, and then when removing the bottle from the platform to first give it an upward movement when needed to cause the final small quantity of liquid to enter and then remove the neck downwardly from the nozzle.

As will be understood, the attendant may leave the machine, and all the bottles when they reach standard weight will move down and permit the closure of their valves, so that there is no danger of waste when the attendant leaves the machine.

The adjustment of the table and weights permits the machine to be used with many sizes and varieties of bottles. The nozzles and platforms should be so numerous that the first bottle is about filled when the last one is placed on its platform, when the bottles may be filled about as fast as a person can pass one bottle forward and remove another without regard to the time required for the flow of liquid into each bottle.

What I claim is—

1. The combination with the valve-seat and slotted nozzle, of an annular weight grooved in its lower face and surrounding the nozzle, a pin extending through the slot in the nozzle, and a valve-plug above the valve-seat and connected to said pin, substantially as described.

2. The combination of a tank and a filling-nozzle projecting downward therefrom, a valve in said nozzle, means connected to said valve by which a bottle-neck surrounding the nozzle opens the valve, a bottle-supporting platform under the nozzle, a lever on knife-edge bearings supporting said platform and means connected to the platform for retaining the same in substantially horizontal position.

3. The combination with a tank and filling-nozzle projecting downward therefrom, of a valve within the nozzle, a weight surrounding said nozzle and connected to said valve so as to lift the valve when the weight is lifted, a bottle-supporting platform under the nozzle, a lever supporting said nozzle on the knife-edge bearings, a pendant from said platform, a supporting-table through a hole in which the pendant passes, and a bar pivoted to said pendant and pivoted under the table.

4. In combination with a filling-nozzle, a yielding platform having a cavity in its upper surface, and an annular plate having its inner edge extending over the cavity, whereby an elastic bottle-rest is attained.

In testimony whereof I affix my signature in presence of two witnesses.

FREDERICK J. LEWIS.

Witnesses:
C. A. ELLIOTT,
FRANK F. ATKINSON.